(12) United States Patent  
Chang et al.

(10) Patent No.: US 10,018,760 B2  
(45) Date of Patent: Jul. 10, 2018

(54) OPTICAL FILM

(71) Applicant: LG CHEM, LTD., Seoul (KR)

(72) Inventors: Jun Won Chang, Daejeon (KR); Moon Soo Park, Daejeon (KR); Dae Hee Lee, Daejeon (KR); Sergey Belyaev, Daejeon (KR)

(73) Assignee: LG CHEM, LTD., Seoul (KR)

( * ) Notice: Subject to any disclaimer, the term of this patent is extended or adjusted under 35 U.S.C. 154(b) by 79 days.

(21) Appl. No.: 14/617,583

(22) Filed: Feb. 9, 2015

(65) Prior Publication Data

US 2015/0153497 A1 Jun. 4, 2015

Related U.S. Application Data

(63) Continuation of application No. PCT/KR2014/009256, filed on Oct. 1, 2014.

(30) Foreign Application Priority Data

Oct. 1, 2013 (KR) .................. 10-2013-0117084  
Oct. 1, 2014 (KR) .................. 10-2014-0132262

(51) Int. Cl.
  *G02F 1/13363* (2006.01)  
  *G02F 1/1343* (2006.01)  
  *G02B 5/30* (2006.01)

(52) U.S. Cl.
  CPC ......... *G02B 5/3016* (2013.01); *G02B 5/3083* (2013.01); *G02F 1/13363* (2013.01);  
  (Continued)

(58) Field of Classification Search
  CPC ........ G02F 2001/133633; G02F 2001/133631; G02F 2001/133637; G02F 2001/133638; G02F 2413/01; G02F 2413/09; G02F 2413/12; G02F 2413/14; G02F 1/13363; G02F 1/133634; G02F 1/1334; G02F 1/133703; G02F 1/134363; G02F 1/133788; G02F 2001/133715; G02F 2001/133726; G02F 2202/023; G02F 2413/11; G02F 1/13364; G02F 2202/022; G02B 5/3083; G02B 5/3016  
  (Continued)

(56) References Cited

U.S. PATENT DOCUMENTS 7,326,364 B2 * 2/2008 Jeon .................. G02F 1/133634  
  252/299.01  
7,755,728 B2 * 7/2010 Ichihashi ............. G02B 5/3083  
  349/117  
(Continued)

FOREIGN PATENT DOCUMENTS

CN  1782810 A  6/2006  
CN  1806192 A  7/2006  
(Continued)

*Primary Examiner* — Angela Davison  
(74) *Attorney, Agent, or Firm* — Dentons US LLP

(57) ABSTRACT

The present application relates to an optical film, a complex polarizing plate, and a liquid crystal display. The present application is directed to providing the optical film or complex polarizing plate, and the liquid crystal display including the same which may be effectively applied to optical compensation of various liquid crystal displays, in particular, so-called in plane switching (IPS) liquid crystal displays.

13 Claims, 6 Drawing Sheets

(52) U.S. Cl.
CPC .. *G02F 1/133634* (2013.01); *G02F 1/134363* (2013.01); *G02F 2001/133631* (2013.01); *G02F 2001/133633* (2013.01); *G02F 2001/133637* (2013.01)

(58) Field of Classification Search
USPC .............................. 349/117–119; 359/489.07
See application file for complete search history.

(56) References Cited

U.S. PATENT DOCUMENTS

| | | | |
|---|---|---|---|
| 7,782,428 B2* | 8/2010 | Jeon | G02F 1/133634 349/117 |
| 2008/0129940 A1 | 6/2008 | Kashima | |
| 2010/0134910 A1* | 6/2010 | Chae | G02B 5/32 359/896 |
| 2010/0157204 A1 | 6/2010 | Ichihashi et al. | |
| 2011/0001906 A1 | 1/2011 | Chang et al. | |
| 2011/0032463 A1 | 2/2011 | Jeon et al. | |
| 2012/0314159 A1* | 12/2012 | Sakai | G02F 1/13363 349/96 |
| 2013/0163082 A1* | 6/2013 | Tamada | G02B 5/3083 359/489.07 |
| 2013/0229605 A1 | 9/2013 | Do et al. | |
| 2014/0240830 A1 | 8/2014 | Chae et al. | |

FOREIGN PATENT DOCUMENTS

| | | |
|---|---|---|
| CN | 101103305 A | 1/2008 |
| CN | 101617249 A | 12/2009 |
| JP | 2004-77720 A | 3/2004 |
| JP | 2006-178401 A | 7/2006 |
| JP | 2007-522533 A | 8/2007 |
| JP | 2008-282009 A | 11/2008 |
| JP | 2009-053684 A | 3/2009 |
| JP | 2010-537227 A | 12/2010 |
| KR | 10-2005-0073221 A | 7/2005 |
| KR | 10-2009-0017437 A | 2/2009 |
| KR | 10-2009-0101620 A | 9/2009 |
| KR | 10-2010-0071459 A | 6/2010 |
| KR | 10-2013-0003070 A | 1/2013 |
| KR | 10-2013-0101327 A | 9/2013 |
| TW | 200527078 A | 8/2005 |

* cited by examiner

OPTICAL FILM

This application is a Continuation Bypass Application of International Application No. PCT/KR2014/009256, filed on Oct. 1, 2014, and claims priority to Korean Application Nos. 10-2013-0117084, filed on Oct. 1, 2013, and 10-2014-0132262, filed on Oct. 1, 2014, all of which are hereby incorporated by reference in their entireties as if fully set forth herein.

FIELD

The present application relates to an optical film, a complex polarizing plate, and a liquid crystal display device.

BACKGROUND

As a representative display device, a liquid crystal display (LCD) has a liquid crystal cell containing liquid crystal molecules. The liquid crystal molecules contained in the liquid crystal cell have birefringence, which generates a difference in a refractive index of light according to the viewing position of the LCD, and thus there is a problem of degradation in the quality of the screen implemented according to the viewing position when viewing the LCD. In consideration of this problem, various retardation films such as an optical compensation film capable of being applied to the LCD have been proposed (e.g., the patent documents 1 and 2).

PRIOR ART DOCUMENT

Patent Document

PATENT DOCUMENT 1: Korean Patent Laid-Open Application No. 2013-0101327
PATENT DOCUMENT 2: Korean Patent Laid-Open Application No. 2013-0003070

DESCRIPTION

Object

The present application is directed to providing an optical film, a complex polarizing plate, and a liquid crystal display. The present application is directed to providing an optical film or a complex polarizing plate, and a liquid crystal display including the same which may be effectively applied to optical compensation of various liquid crystal displays, in particular, so-called in plane switching (IPS) liquid crystal displays.

Solution

According to an aspect of the present application, an illustrative optical film includes a negative biaxial retardation layer, a vertically aligned liquid crystal layer, and an isotropic layer having a difference of 0.1 or more in a refractive index from the negative biaxial retardation film or the vertically aligned liquid crystal layer.

Unless otherwise defined, the term "refractive index" or "retardation" used herein refers to a refractive index or retardation with respect to light with a wavelength of 550 nm. Further, in the difference in the refractive index between the isotropic layer and the negative biaxial retardation layer or the vertically aligned liquid crystal layer, a "refractive index of the retardation film or the liquid crystal layer" refers to an average refractive index, that is, an average value ({Nx+Ny+Nz}/3) of a refractive index in a slow-axis direction (Nx), a refractive index in a fast-axis direction (Ny), and a refractive index in a thickness direction (Nz), which will be described below.

The term "negative biaxial retardation layer" used herein may refer to a retardation layer of which the refractive index in the slow-axis direction (Nx), the refractive index in the fast-axis direction (Ny), and the refractive index in the thickness direction (Nz) satisfy a relationship of Nx>Ny>Nz.

In the above description, the slow-axis direction may mean a direction showing the highest refractive index in a plane of a retardation layer, the fast-axis direction may mean a direction perpendicular to the slow axis in a plane of retardation layer, and the thickness direction may mean a direction perpendicular to the slow axis and fast axis. For example, when an X-axis direction of a retardation layer 100 is assumed to be a slow-axis direction in FIG. 1, a Y-axis direction perpendicular thereto may be a fast-axis direction, and a Z-axis direction perpendicular to the X axis and Y axis may be a thickness direction.

Further, the term "vertically aligned liquid crystal layer" used herein may mean a liquid crystal polymer layer including substantially vertically aligned liquid crystals, and the polymer layer may exhibit so-called +C plate properties. In the above description, the +C plate properties may mean a case in which the refractive index in the slow-axis direction (Nx) and the refractive index in the fast-axis direction (Ny) are substantially the same, and the refractive index in the thickness direction (Nz) is greater than the refractive index in the fast-axis direction (Ny) (Nz>Ny). In the above description, the sameness of the refractive index in the slow-axis direction (Nx) and the refractive index in the fast-axis direction (Ny) is substantial sameness, and thus a case in which there is a slight difference due to a fabrication error also falls into the category of substantial sameness. Further, the vertically aligned liquid crystal layer may include a part of liquid crystals which is not vertically aligned as long as the vertically aligned liquid crystal layer exhibits +C plate properties.

Further, the term "isotropic layer" used herein may mean a case in which all of the refractive index in the slow-axis direction (Nx), the refractive index in the fast-axis direction (Ny), and the refractive index in the thickness direction (Nz) are substantially the same. In the above description, the sameness is also substantial sameness, and thus a case in which there is a slight difference due to a fabrication error also falls into the category of substantial sameness.

In the optical film, the vertically aligned liquid crystal layer may be present at a lower part of the negative biaxial retardation layer. Further, the isotropic layer may be present between the negative biaxial retardation layer and the vertically aligned liquid crystal layer, at an upper part of the negative biaxial retardation layer, or at a lower part of the vertically aligned liquid crystal layer. FIGS. 2 and 3 are cross-sectional views of illustrative optical films 50 and complex polarizing plates 60, FIG. 2 shows a case in which an isotropic layer 30 is present between a retardation layer 10 and a liquid crystal layer 20, and FIG. 3 shows a case in which the liquid crystal layer 20 and the isotropic layer 30 are sequentially present at a lower part of the retardation layer 10. Although not shown in the drawing, the isotropic layer 30 may be present at an upper part of the retardation layer 10.

The terms "upper part" and "lower part" used herein is a concept of setting a mutual position relationship between the layers included in the optical film or complex polarizing plate such as the retardation layer, liquid crystal layer, isotropic layer, or the like, and do not necessarily mean that the corresponding layer faces up or down.

The retardation layer having the above-described structure may be usefully used as a compensation film in various liquid crystal displays, and in particular, may be usefully used as a compensation film capable of minimizing light leakage generated at a tilt angle in a black state, ensuring a high contrast ratio, and suppressing a color shift in so-called IPS liquid crystal displays.

The negative biaxial retardation layer included in the optical film may have in-plane retardation (Rin) in a range of 20 to 300 nm with respect to light with a wavelength of 550 nm. In another embodiment, the in-plane retardation (Rin) may be about 25 nm or more, 30 nm or more, 35 nm or more, 40 nm or more, 45 nm or more, 50 nm or more, 55 nm or more, 60 nm or more, 65 nm or more, 70 nm or more, 80 nm or more, 90 nm or more, 100 nm or more, or 110 nm or more. Further, in another embodiment, the in-plane retardation (Rin) may be about 250 nm or less, about 240 nm or less, about 230 nm or less, about 220 nm or less, about 210 nm or less, about 200 nm or less, about 190 nm or less, about 180 nm or less, about 170 nm or less, about 160 nm or less, about 150, about 140 or about 130 nm or less. With the above-described in-plane retardation (Rin), the optical film may effectively perform a desired function when applied to a liquid crystal display, particularly to an IPS liquid crystal display. The term "in-plane retardation" used herein may be calculated by the following Expression 1.

$$Rin = d \times (Nx - Ny) \qquad \text{[Expression 1]}$$

In Expression 1, Rin is the in-plane retardation, d is a thickness of the corresponding layer, Nx is the refractive index in the slow-axis direction of the corresponding layer (based on a wavelength of 550 nm), and Ny is the refractive index in the fast-axis direction of the corresponding layer (based on a wavelength of 550 nm).

The negative biaxial retardation layer may have retardation in a thickness direction (Rth) in a range of −400 to −5 nm with respect to light with a wavelength of 550 nm. In another embodiment, the retardation in the thickness direction (Rth) may be about −350 nm or more, −300 nm or more, −250 nm or more, −200 nm or more, about −150 nm or more, −100 nm or more, −80 nm or more, or −60 nm or more. Further, in another embodiment, the retardation in the thickness direction (Rth) may be about −10 nm or less, about −15 nm or less, about −20 nm or less, −25 nm or less, −30 nm or less, −35 nm or less, or −40 nm or less. With the above-described retardation in the thickness direction (Rth), the optical film may effectively perform a desired function when applied to the liquid crystal display, particularly in the IPS liquid crystal display. The term "retardation in a thickness direction" used herein may be calculated by the following Expression 2.

$$Rth = d \times (Nz - Ny) \qquad \text{[Expression 2]}$$

In Expression 2, Rin is the in-plane retardation, d is a thickness of the corresponding layer, Nz is the refractive index in the thickness direction of the corresponding layer (based on a wavelength of 550 nm), and Ny is the refractive index in the fast-axis direction of the corresponding layer (based on a wavelength of 550 nm).

The negative biaxial retardation layer may have so-called normal wavelength dispersion, flat wavelength dispersion, or reverse wavelength dispersion, and in an embodiment, may have normal wavelength dispersion.

Various well-known materials may be used as the negative biaxial retardation layer. Various types of retardation layers exhibiting features as described above are well known in fields related to retardation layers. In the embodiment, the retardation layer may be a polymer film. A method of providing retardation by performing stretching or the like on the polymer film is known as a well-known method. As the polymer film, a cellulose film such as a triacetyl cellulose (TAC) film, a cyclic olefin polymer film such as a polynorbonene (PNB) film, a polyester film such as a polycarbonate (PC) film, an acrylic polymer film, or the like may be used. The polymer film as described above may be a uniaxially or biaxially oriented film to provide retardation.

A thickness of the negative biaxial retardation layer is not particularly limited. However, the thickness may be determined within a range of about 1 to 100 μm in consideration of probability of achievement of the desired retardation or application to products. In another embodiment, the thickness may be about 5 μm or more, 10 μm or more, 15 μm or more, or about 20 μm or more. In another embodiment, the thickness may be about 90 μm or less, about 80 μm or less, about 70 μm or less, about 60 μm or less, about 50 μm or less, about 40 μm or less, or about 30 μm or less.

The vertically aligned liquid crystal layer included in the optical film is a liquid crystal polymer layer including a substantially vertically aligned liquid crystal as described above, which may have +C plate properties. A variety of the substantially vertically aligned liquid crystal polymer layers capable of exhibiting +C plate properties are well known. The in-plane retardation (Rin) with respect to light with a wavelength of 550 nm described above of the vertically aligned liquid crystal layer is substantially 0 nm. However, even the vertically aligned liquid crystal layer may have a difference between the refractive index in the slow-axis direction (Nx) and the refractive index in the fast-axis direction (Ny) to a certain degree due to a fabrication error or the like as described above. Accordingly, the in-plane retardation (Rin) in the vertically aligned liquid crystal layer may be in a range of −10 to 10 nm, −5 to 5 nm, or −3 to 3 nm.

The retardation in the thickness direction (Rth) with respect to light with a wavelength of 550 nm of the vertically aligned liquid crystal layer has a positive value. In the embodiment of the present application, the retardation in the thickness direction of the vertically aligned liquid crystal layer may be determined in a range in which a sum value of the retardation and the retardation in the thickness direction of the negative biaxial retardation layer has a positive value. For example, the sum value, that is, the sum of the retardation in the thickness direction (Rth) (based on a wavelength of 550 nm) of the vertically aligned liquid crystal layer and the retardation in the thickness direction (Rth) (based on a wavelength of 550 nm) of the negative biaxial retardation layer may be more than 0 nm, 5 nm or more, 10 nm or more, 15 nm or more, 20 nm or more, 25 nm or more, 30 nm or more, 35 nm or more, 40 nm or more, 45 nm or more, 50 nm or more, 60 nm or more, 70 nm or more, 75 nm or more, or 80 nm or more. The sum also may be 500 nm or less, 450 nm or less, 400 nm or less, 350 nm or less, 300 nm or less, 260 nm or less, 230 nm or less, 200 nm or less, 180 nm or less, 160 nm or less, 140 nm or less, 120 nm or less, 100 nm or less, or 90 nm or less. These ranges may be important for optical compensation of the liquid crystal display, in particular, optical compensation of the IPS liquid crystal display.

A range of the retardation in the thickness direction of the vertically aligned liquid crystal layer is not particularly limited as long as it satisfies the above-described sum value, and for example, may be in a range of about 50 to 500 nm. The retardation in the thickness direction (Rth) may be about 100 nm or more, or 110 nm or more in another embodiment. In another embodiment, the retardation in the thickness direction (Rth) may be about 450 nm or less, about 400 nm or less, about 350 nm or less, about 300 nm or less, about 250 nm or less, about 200 nm or less, or about 150 nm or less.

The vertically aligned liquid crystal layer may have so-called normal wavelength dispersion, flat wavelength dispersion, or reverse wavelength dispersion, and in the embodiment, may have normal wavelength dispersion.

As described above, a variety of vertically aligned liquid crystal layers showing +C plate properties are well known, and a proper type thereof having the above-described properties may be selected among these well-known materials and used.

A thickness of the vertically aligned liquid crystal layer is not particularly limited, and may be determined within a proper range in consideration of the desired range of retardation and probability of application to products, etc.

The optical film may include an isotropic layer. The isotropic layer has a the absolute value of the difference of 0.1 or more in the refractive index from the negative biaxial retardation layer or vertically aligned liquid crystal layer, and has a thickness in a range of 100 to 200 nm, 100 to 195 nm, 100 to 190 nm, 100 to 185 nm, 100 to 180 nm, or 100 to 175 nm. The above-described isotropic layer induces so-called polarization rotation and thin layer interference when light penetrates the optical film, and thus entire optical properties of the optical film may be controlled to be suitable for optical compensation of the liquid crystal display, in particular, the IPS liquid crystal display. The absolute value of the difference in the refractive index and thickness of the isotropic layer are important in an entire structure of the optical film, that is, a structure including the negative biaxial retardation layer and the vertically aligned liquid crystal layer. That is, when the absolute value of the difference in the refractive index and thickness of the isotropic layer are not in the above-described range, it is hard to control optical properties of the optical film to be suitable for compensation of the liquid crystal display.

The absolute value of the difference in the refractive index from the negative biaxial retardation layer or vertically aligned liquid crystal layer of the isotropic layer may be about 0.1 or more, and in another embodiment, may be about 0.15 or more, or about 0.2 or more. In another embodiment, the absolute value of the difference may be about 1 or less, about 0.9 or less, about 0.8 or less, about 0.7 or less, about 0.6 or less, about 0.5 or less, about 0.4 or less, or about 0.3 or less. The isotropic layer having the difference in the refractive index in the range as above described and a thickness in a range of 100 to 200 nm may properly control optical properties of the optical film.

The refractive index of the isotropic layer is not particularly limited as long as it has the absolute value of the difference in the refractive index as above described. The refractive index of the isotropic layer may be higher, or alternatively, lower than the retardation layer or liquid crystal layer. In the embodiment, the isotropic layer may have the refractive index higher than the retardation layer or liquid crystal layer, and here, the refractive index may be in a range of about 1.5 or more, about 1.6 or more, about 1.7 or more, or about 1.75 or more. In another embodiment, the refractive index may be about 2.5 or less, about 2 or less, about 1.9 or less, or about 1.85 or less in the above-described case. In another embodiment, the isotropic layer may have the refractive index lower than the retardation layer or liquid crystal layer, and here, the refractive index may be in a range of about 1.4 or less, about 1.35 or less, or about 1.3 or less. In another embodiment, the refractive index may be about 1.1 or more, about 1.2 or more or about 1.25 or more in the above-described case.

A material of the isotropic layer is not particularly limited as long as it has the refractive index as above described and is substantially isotropic. For example, when the isotropic layer is a high reflective layer, the isotropic layer may be a layer including indium tin oxide (ITO), ZnS, titanium oxide, or the like. Further, when the isotropic layer is a low reflective layer, the isotropic layer may include, for example, a well-known silicone-modified fluoropolymer such as that of U.S. Patent Laid-Open Application No. 2006-0148824, silicon oxide nanoparticles, or silicon materials such as a material well known under the product name LSS-2233-10-PST (commercially available from Polymer Systems Technology Limited), etc. In addition to the above-described materials, any material having a difference of 0.1 or more in the refractive index from an average refractive index of the optical film, and that is isotropic may be used as a structure material of the isotropic material layer.

A method of forming an isotropic layer with the above-described material is not particularly limited. For example, when the isotropic layer is an inorganic material layer, a method such as well-known sputtering, vacuum evaporation, or the like, or a method such as sol-gel coating or the like may be applied. When the isotropic layer is an organic material layer, an evaporation method such as so-called iCVD or the like, or a wet or dry coating method may be applied.

The optical film of the embodiment of the present application may further include another layer in addition to the above-described retardation layer, liquid crystal layer, and isotropic layer as necessary. For example, the optical film may further include a vertically aligned layer disposed adjacent to the liquid crystal layer. Types of the vertically aligned liquid crystal layer are not particularly limited, and any well-known vertically aligned liquid crystal layer may be used.

According to another aspect of the present application, there is provided a complex polarizing plate. The complex polarizing plate of the embodiment of the present application as shown in FIGS. 2 and 3, may include a polarizer 40 and the optical film 50 disposed at one side of the polarizer 40. The above-described polarizing plate may be a polarizing plate for the liquid crystal display, for example, for the IPS liquid crystal display. Further, the polarizing plate may be a viewer side polarizing plate. The term "viewer side polarizing plate" used herein may refer to a polarizing plate disposed closer to the viewer side among the polarizing plates included in the liquid crystal display.

Types of the polarizer applied to the polarizing plate of the embodiment of the present application are not particularly limited, and a well-known polarizer may be used. For example, the polarizer may be polyvinyl alcohol films on which a dichroic material such as iodine or the like is absorbed and oriented or the like, a coating layer of a lyotropic liquid crystal compound, or a coating layer of host guest-type liquid crystal compositions including a reactive liquid crystal composition and a dichroic dye.

In the optical film of the complex polarizing plate, the negative biaxial retardation layer may be disposed closer to the polarizer than the vertically aligned liquid crystal layer, or alternatively, the vertically aligned liquid crystal layer may be disposed closer to the polarizer than the negative biaxial retardation layer.

In the above description, when the negative biaxial retardation layer of the optical film is disposed closer to the polarizer than the vertically aligned liquid crystal layer, an angle between a slow axis of the negative biaxial retardation layer and a light absorption axis of the polarizer may be in a range of about 80 to 100 degrees, about 85 to 95 degrees, or about 90 degrees. On the other hand, when the vertically aligned liquid crystal layer of the optical film is disposed closer to the polarizer than the negative biaxial retardation layer, an angle between a slow axis of the negative biaxial retardation layer and a light absorption axis of the polarizer may be in a range of about 170 to 190 degrees, about 175 to 185 degrees, or about 180 degrees. The complex polarizing plate may be effectively applied to optical compensation of the liquid crystal display, in particular, the IPS liquid crystal display, by controlling the slow axis of the retardation layer within the above-described range.

In the embodiment of the present application, the complex polarizing plate may further include another layer in addition to the above-described polarizer and optical film as necessary. For example, the complex polarizing plate may include a polarizer protective film disposed at either or both sides of the polarizer. Types of the polarizer protective film are not particularly limited. Further, the complex polarizing plate does not necessarily include the protective film. For example, when the optical film functions as the protective film, the optical film may be used as an inner protective film. The term "inner protective film" used herein may refer to a protective film disposed between the liquid crystal cell and polarizer when the complex polarizing plate is applied to the liquid crystal display.

According to another aspect of the present application, there is provided a liquid crystal display, for example, an IPS liquid crystal display including the optical film or complex polarizing plate. The term "IPS liquid crystal display" used herein may include a liquid crystal display of a so-called super in plane switching (SIPS) or fringe field switching (FFS) mode as well as a general IPS mode. The liquid crystal display may include at least a sequentially arranged viewer side polarizing plate, liquid crystal cell and lower side polarizing plate. In the above description, the term "viewer side polarizing plate" may refer to a polarizing plate disposed closer to the viewer than a lower side polarizing plate. When the optical film is included, the optical film may be disposed between the viewer side polarizing plate and the liquid crystal cell.

In the above description, the optical film may have the negative biaxial retardation layer disposed closer to the vertically aligned liquid crystal layer than the viewer side polarizing plate, or alternatively, the vertically aligned liquid crystal layer disposed closer to the viewer side polarizing plate than the retardation layer. When the retardation layer is disposed closer to the viewer side polarizing plate, an angle between a slow axis of the retardation layer and a light absorption axis of the viewer side polarizing plate may be in a range of about 80 to 100 degrees, about 85 to 95 degrees, or may be about 90 degrees. On the other hand, when the vertically aligned liquid crystal layer is disposed closer to the retardation layer than the viewer side polarizing plate, an angle between a slow axis of the negative biaxial retardation layer and a light absorption axis of the viewer side polarizing plate may be in a range of about 170 to 190 degrees, about 175 to 185 degrees, or may be about 180 degrees. The optical film may be effectively applied to optical compensation of the liquid crystal display, in particular, the IPS liquid crystal display, by controlling the slow axis of the retardation layer within the above-described range.

On the other hand, when the liquid crystal display includes the complex polarizing plate, the complex polarizing plate may be used as a polarizing plate on the viewer side of the display, and here, the optical film may be disposed between the polarizer and the liquid crystal cell in the complex polarizing plate.

Types of the other component included in the liquid crystal display of the embodiment of the present application or arrangements thereof are not particularly limited, and general items applied in the liquid crystal display field may be applied.

For example, when the liquid crystal display is an IPS liquid crystal display, the liquid crystal cell may contain a horizontally aligned liquid crystal of which an optical axis (e.g., a slow axis) is present on a plane parallel to planes of the viewer side polarizing plate and lower side polarizing plate, and the liquid crystals may have positive dielectric anisotropy or negative dielectric anisotropy. Further, light absorption axes of the viewer side polarizing plate and lower side polarizing plate may be disposed perpendicular to each other. Further, the IPS liquid crystal display may be a so-called O-mode or E-mode liquid crystal display, and accordingly, the optical axis (e.g., a slow axis) of the liquid crystal cell containing the horizontally aligned liquid crystal may be disposed parallel to or perpendicular to the light absorption axis of the lower side polarizing plate in a black state.

Effect

The present application can provide the optical film or complex polarizing plate which can be effectively applied to optical compensation for various liquid crystal displays, in particular, the so-called in plane switching (IPS) liquid crystal displays and the liquid crystal display including the same.

DETAILED DESCRIPTION OF ILLUSTRATIVE EMBODIMENTS

Hereinafter, the optical film will be described in detail in conjunction with examples and comparative examples, but the scope of the optical film is not intended to be limited to the following examples.

1. Retardation Property Evaluation

Retardation properties or the like according to in-plane retardation or retardation in a thickness direction and wavelength of a retardation layer or liquid crystal layer in examples and comparative examples were measured with an Axoscan device (made by Axometrics, Inc.) capable of measuring 16 Muller matrices. Without retardation properties according to wavelength, the in-plane retardation or the retardation in the thickness direction was measured based on light with a wavelength of 550 nm. 16 Muller matrices were measured using an Axoscan device according to a manual of the manufacturer, and thereby retardation was extracted.

2. Layer Thickness Evaluation

In examples and comparative examples, a thickness of specimens such as a thickness of an isotropic layer or the like was measured using an F20 device available from Filmetrics, Inc. according to a manual of the manufacturer.

Example 1

Figure 1:
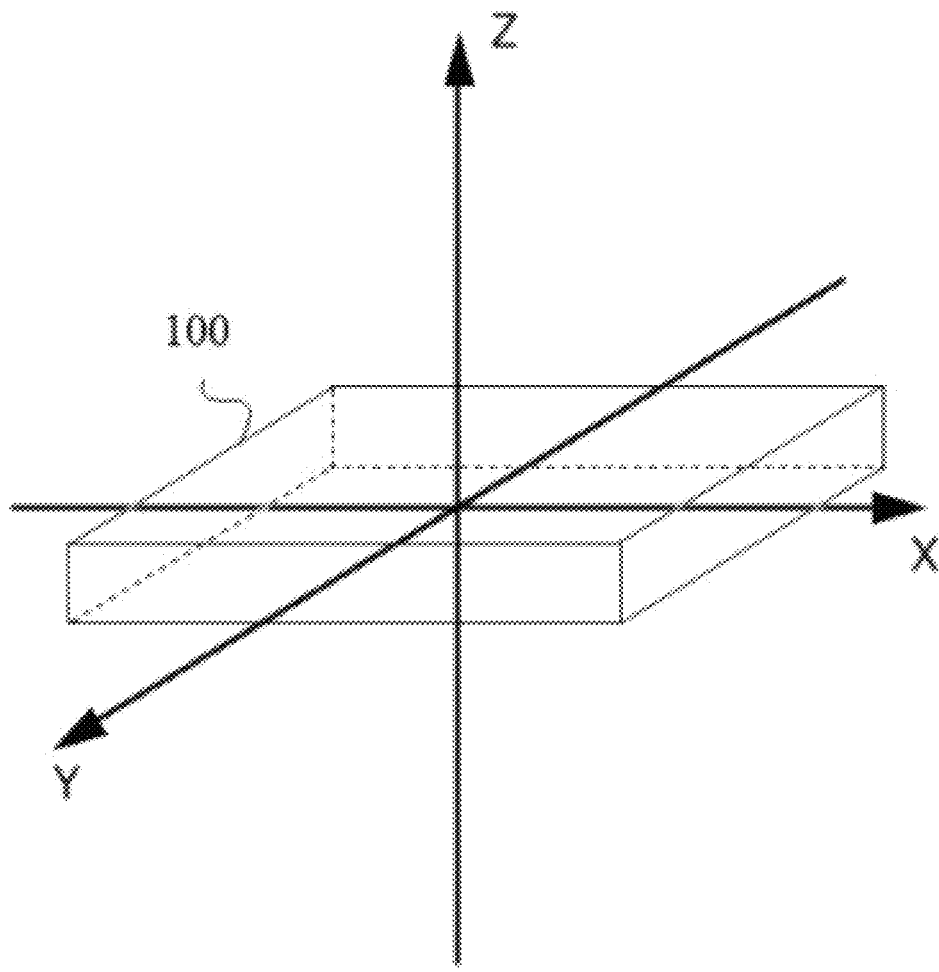
FIG. 1 is an illustrative view illustrating a slow axis, fast axis, and thickness direction of a retardation layer or liquid crystal layer.
Figure 2:
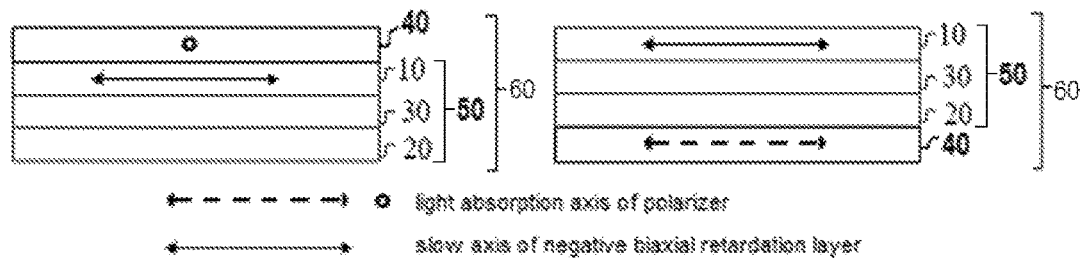
FIGS. 2 and 3 are cross-sectional views showing an illustrative structure of an optical film and a complex polarizing plate.
Figure 3:
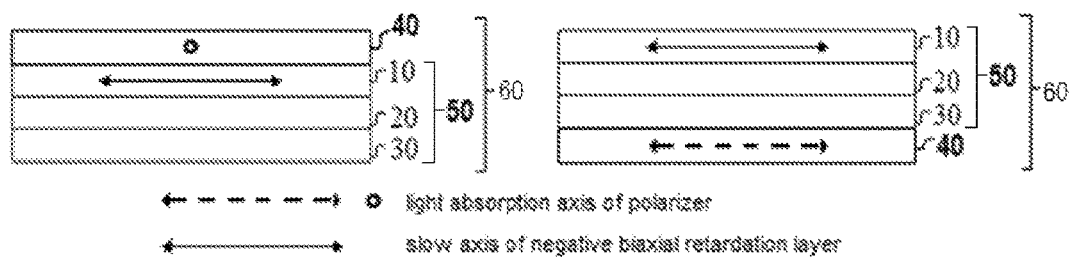
Figure 4:
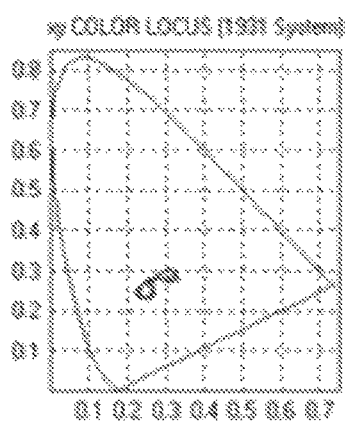
FIGS. 4 to 7 are each views showing characteristics of the optical films of examples.
Figure 8:
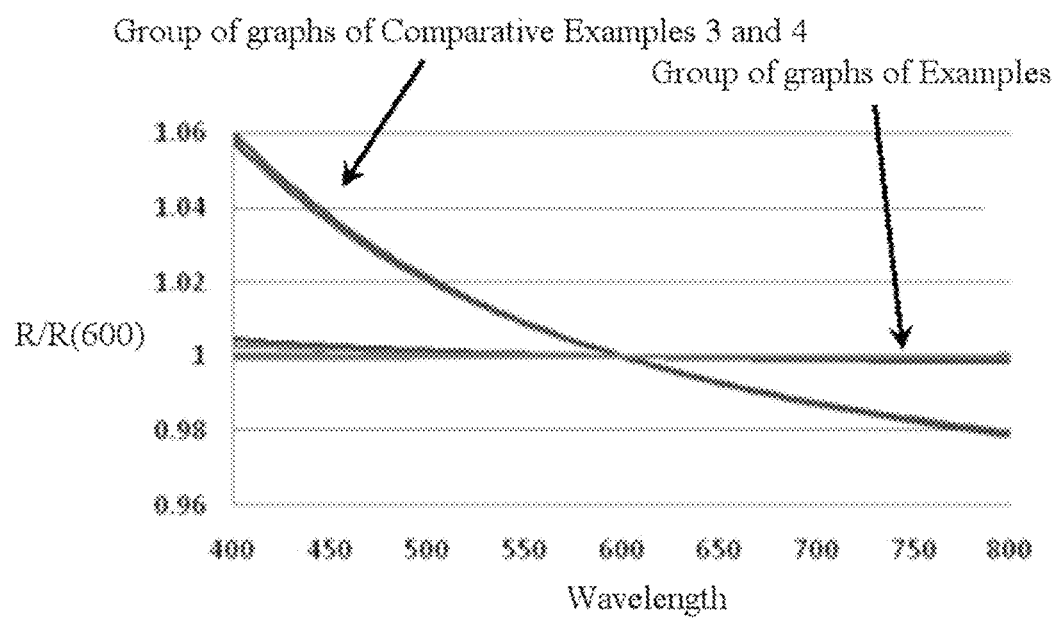
FIG. 8 is a view showing wavelength dispersion of examples and comparative examples.
Figure 9:
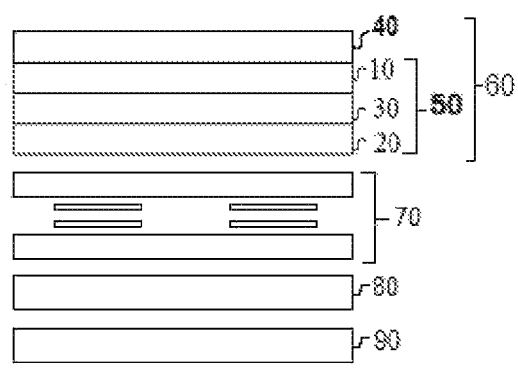
FIG. 9 is a cross-sectional view showing an illustrative structure of an IPS LCD of example 1.

As a negative biaxial retardation layer 10, a vertically aligned layer was formed on one surface of an acrylic polymer film (thickness: about 25 μm, and refractive index: about 1.51) which has the in-plane retardation (based on wavelength: 550 nm) of about 120 nm and the retardation in the thickness direction (based on wavelength: 550 nm) of about ~45 nm through a well-known method, a reactive liquid crystal compound (a reactive mesogen:RM) which can be vertically aligned was oriented and polymerized on the vertically aligned layer, and thereby the vertically aligned layer 20 (refractive index: about 1.55) having the retardation in the thickness direction of about +130 nm was formed. Subsequently, an indium tin oxide (ITO) layer was deposited on the vertically aligned liquid crystal layer 20 using a well-known sputtering method, and an isotropic layer 30 having the refractive index of about 1.8 and a thickness of about 100 nm was formed. Thereafter, a well-known poly(vinyl alcohol) (PVA) based absorptive polarizer 40 was adhered to a surface on which the vertically aligned liquid crystal layer of the acrylic polymer film was not formed such that a light absorption axis of the polarizer was perpendicular to a slow axis of the acrylic polymer film, and thereby a complex polarizing plate 60 was prepared. The complex polarizing plate 60 was adhered to an IPS-mode liquid crystal cell 70 as a viewer side polarizing plate, and thereby a liquid crystal display was prepared. The prepared liquid crystal display sequentially included a lower side polarizing plate 80 and backlight unit 90 on the side of the liquid crystal cell opposite to the side on which the complex polarizing plate 60 was disposed in addition to the complex polarizing plate, and light absorption axes of the complex polarizing plate and the lower side polarizing plate were perpendicular to each other. The liquid crystal cell included a horizontally aligned liquid crystal, the in-plane retardation was in a range of about 295 nm, and a slow axis of the horizontally aligned liquid crystal was perpendicular to the light absorption axis of the complex polarizing plate in a black state. FIG. 4 is an image of a color shift in a tilt angle of the complex polarizing plate using EZ contrast 160R available from ELDIM in a tilt angle, and wavelength dispersion of the optical film (laminate of acrylic film, vertically aligned liquid crystal layer, and ITO layer) is shown in FIG. 8. In FIGS. 4 and 8, the laminate or complex polarizing plate may be determined to exhibit excellent wavelength dispersion which are equal as so-called reverse-wavelength dispersion and a compensation effect in a viewing angle. Referring to FIG. 8, wavelength dispersion in Example 1 and other examples that will be described below are determined to be similar as can be seen from the overlapping lines in the graph. Further, lines of Examples 3 and 4 that will be described below are determined to be similar as can be seen from the overlapping lines in the graph, while being in a different pattern from Example 1.

Example 2

Figure 5:
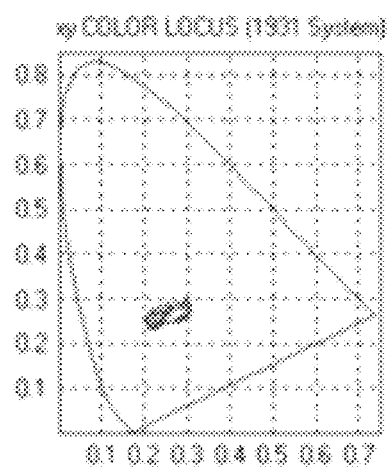

The optical film, complex polarizing plate, and IPS liquid crystal display were prepared in the same manner as in Example 1 except that an ITO layer having a thickness of about 143 nm was formed on the vertically aligned liquid crystal layer. FIG. 5 is an image of a color shift in a tilt angle of the complex polarizing plate measured using EZ contrast 160R of ELDIM, and wavelength dispersion of the optical film (laminate of acrylic film, vertically aligned liquid crystal layer, and ITO layer) is shown in FIG. 8. In FIGS. 5 and 8, the laminate or complex polarizing plate may be determined to exhibit excellent wavelength dispersion which is equal as so-called reverse-wavelength dispersion and a compensation effect in a viewing angle.

Example 3

Figure 6:
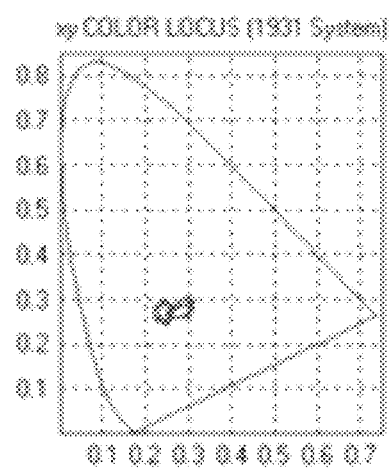

The optical film, complex polarizing plate, and IPS liquid crystal display were prepared in the same manner as in Example 1 except that an ITO layer having a thickness of about 154 nm was formed on the vertically aligned liquid crystal layer. FIG. 6 is an image of a color shift in a tilt angle of the complex polarizing plate measured using EZ contrast 160R available from ELDIM, and wavelength dispersion of the optical film (laminate of acrylic film, vertically aligned liquid crystal layer, and ITO layer) is shown in FIG. 8. In FIGS. 6 and 8, the laminate or complex polarizing plate is determined to exhibit excellent wavelength dispersion which is equal as so-called reverse-wavelength dispersion and a compensation effect in a viewing angle.

Example 4

Figure 7:
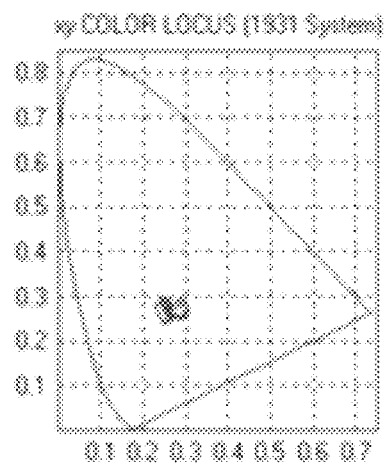

The optical film, complex polarizing plate, and IPS liquid crystal display were prepared in the same manner as in Example 1 except that an ITO layer having a thickness of about 170 nm was formed on the vertically aligned liquid crystal layer. FIG. 7 is an image of a color shift in a tilt angle of the complex polarizing plate measured using EZ contrast 160R available from ELDIM, and wavelength dispersion of the optical film (laminate of acrylic film, vertically aligned liquid crystal layer, and ITO layer) is shown in FIG. 8. In FIGS. 7 and 8, the laminate or complex polarizing plate may be determined to exhibit excellent wavelength dispersion which is equal as so-called reverse-wavelength dispersion and a compensation effect in a viewing angle.

Comparative Example 1

The optical film, complex polarizing plate, and IPS liquid crystal display were prepared in the same manner as in Example 1 except that an ITO layer having a thickness of about 200 nm was directly formed without forming a vertically aligned layer and vertically aligned liquid crystal layer on an acrylic polymer film. A compensation effect in a viewing angle thereof was measured in the same manner as in the above-described examples, but a proper compensation effect was not exhibited, and light leakage was severely generated in a tilt angle.

Comparative Example 2

The optical film, complex polarizing plate, and IPS liquid crystal display were prepared in the same manner as in Example 1 except that an ITO layer was not formed on a vertically aligned liquid crystal layer. A compensation effect in a viewing angle thereof was measured in the same manner as in the above-described examples, but a proper compensation effect was not exhibited, and light leakage was severely generated in a tilt angle.

Comparative Example 3

The optical film, complex polarizing plate, and IPS liquid crystal display were prepared in the same manner as in Example 1 except that an ITO layer having a thickness of about 90 nm was formed on a vertically aligned liquid crystal layer. A compensation effect in a viewing angle thereof was measured in the same manner as in the above-described examples, but a proper compensation effect was not exhibited, and light leakage was severely generated in a tilt angle. Further, as shown in FIG. 8, wavelength dispersion was shown to be similar to so-called normal wavelength dispersion, and thereby compensation may be predicted not to be properly achieved.

Comparative Example 4

The optical film, complex polarizing plate, and IPS liquid crystal display were prepared in the same manner as in Example 1 except that an ITO layer having a thickness of about 210 nm was formed on a vertically aligned liquid crystal layer. A compensation effect in a viewing angle thereof was measured in the same manner as in the above-described examples, but a proper compensation effect was not exhibited, and a light leakage was severely generated in a tilt angle. Further, as shown in FIG. 8, wavelength dispersion was shown to be similar to so-called normal wavelength dispersion, and thereby compensation may be predicted not to be properly achieved.

What is claimed is:

1. An optical film for optical compensation of an in plane switching liquid crystal display, comprising: a negative biaxial retardation layer; a vertically aligned liquid crystal layer which is present at a lower part of the negative biaxial retardation layer; and an isotropic layer which is a negative biaxial retardation layer, or at a lower part of the vertically aligned liquid crystal layer, has an absolute value of a difference of 0.1 or more in a refractive index from the negative biaxial retardation layer or vertically aligned liquid crystal layer, and has a thickness in a range of 100 to 200 nm, wherein the vertically aligned liquid crystal layer is a liquid crystal polymer layer including fixed vertically aligned liquid crystals, wherein the negative biaxial retardation layer has normal wavelength dispersion and the vertically aligned liquid crystal layer has normal wavelength dispersion, wherein the optical film has a ratio R/R(600) of 1.02 to 0.98 at a wavelength from 400 nm to 800 nm, and wherein a sum value of retardation in a thickness direction of the vertically aligned liquid crystal layer and the negative biaxial retardation layer is 20 nm or more.

2. The optical film of claim 1, wherein the isotropic layer is present at a lower part of the vertically aligned liquid crystal layer.

3. The optical film of claim 1, wherein the negative biaxial retardation layer has in-plane retardation (Rin) in a range of 20 to 300 nm with respect to light with a wavelength of 550 nm.

4. The optical film of claim 1, wherein the negative biaxial retardation layer has retardation in a thickness direction (Rth) in a range of −400 to −5 nm with respect to light with a wavelength of 550 nm.

5. The optical film of claim 1, wherein the negative biaxial retardation layer is an acrylic polymer film or cyclic olefin polymer film.

6. The optical film of claim 1, wherein the isotropic layer has a refractive index of 1.5 or more.

7. The optical film of claim 1, wherein the isotropic layer has a refractive index of 1.4 or less.

8. The optical film of claim 1, wherein the isotropic layer includes indium tin oxide (ITO), ZnS, titanium oxide, silicone-modified fluoropolymers, silicon oxide particles, or silicon materials.

9. A complex polarizing plate comprising a polarizer, and the optical film of claim 1 which is disposed at one side of the polarizer.

10. The complex polarizing plate of claim 9, wherein the negative biaxial retardation layer of the optical film is disposed closer to the polarizer than the vertically aligned liquid crystal layer, and an angle between a slow axis of the negative biaxial retardation layer and a light absorption axis of the polarizer is in a range of 80 to 100 degrees.

11. The complex polarizing plate of claim 9, wherein the vertically aligned liquid crystal layer of the optical film is disposed closer to the polarizer than the negative biaxial retardation layer, and an angle between a slow axis of the negative biaxial retardation layer and a light absorption axis of the polarizer is in a range of 170 to 190 degrees.

12. A liquid crystal display comprising the complex polarizing plate of claim 9.

13. A liquid crystal display comprising the optical film of claim 1.

* * * * *